(12) United States Patent
Akita et al.

(10) Patent No.: US 6,703,725 B2
(45) Date of Patent: Mar. 9, 2004

(54) JOINT DRIVING APPARATUS

(75) Inventors: Yoshitoshi Akita, Hitachi (JP); Kim Houng Joong, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 47 days.

(21) Appl. No.: 09/793,508

(22) Filed: Feb. 27, 2001

(65) Prior Publication Data

US 2002/0053832 A1 May 9, 2002

(30) Foreign Application Priority Data

Nov. 6, 2000 (JP) .......................................... 2000-342379

(51) Int. Cl.[7] .............................................. H02K 41/03
(52) U.S. Cl. ........................................................ 310/12
(58) Field of Search ............................. 310/12, 13, 14; 318/135

(56) References Cited

U.S. PATENT DOCUMENTS

| | | | | | |
|---|---|---|---|---|---|
| 4,293,235 A | * | 10/1981 | Gomi | ...................... | 400/322 |
| 4,315,197 A | * | 2/1982 | Studer | ...................... | 318/135 |
| 4,816,804 A | * | 3/1989 | Reavell | ...................... | 340/433 |
| 4,945,268 A | * | 7/1990 | Nihei et al. | ...................... | 310/12 |
| 5,271,046 A | * | 12/1993 | Dirauf et al. | ...................... | 376/249 |
| 5,426,353 A | * | 6/1995 | Stuhr et al. | ...................... | 318/15 |
| 5,740,699 A | * | 4/1998 | Ballantyne et al. | ...................... | 74/490.06 |
| 6,172,437 B1 | * | 1/2001 | Du | ...................... | 310/136 |
| 6,216,798 B1 | * | 4/2001 | Riello et al. | ...................... | 173/152 |
| 6,283,189 B1 | * | 9/2001 | Liebscher | ...................... | 160/9 |
| 6,397,798 B1 | * | 6/2002 | Ficcabrino | ...................... | 123/90.11 |
| 6,541,880 B2 | * | 4/2003 | Okada et al. | ...................... | 310/12 |
| 6,548,920 B2 | * | 4/2003 | Joong et al. | ...................... | 310/12 |
| 6,570,274 B2 | * | 5/2003 | Kim et al. | ...................... | 310/12 |

FOREIGN PATENT DOCUMENTS

JP          10-174418          * 6/1998

* cited by examiner

*Primary Examiner*—Dang Le
*Assistant Examiner*—Judson H. Jones
(74) *Attorney, Agent, or Firm*—Antonelli, Terry, Stout & Kraus, LLP

(57) ABSTRACT

In a joint driving apparatus, a linear motor includes at least one stator part, a movable element, and an electromagentic coil device for energizing the stator part to generate a magnetic field, the stator part includes pairs of magnetic poles, the pairs are adjacent to each other in each of the stator parts, the magnetic poles of each of the pairs face to each other through the movable element to generate a magnetic field passing the magnetic poles through the movable element, and a magnetic polar direction of one of the at least two pairs is opposite to that of another one of the at least two pairs when the stator part is magnetized.

23 Claims, 17 Drawing Sheets

JOINT DRIVING APPARATUS

BACKGROUND OF THE INVENTION AND RELATED ART STATEMENT

The present invention relates to a joint driving apparatus for generating a relative movement between first and second members on a joint.

In a prior art joint driving apparatus, a rotational motor is used to generate a relative movement between first and second members on a joint. In another prior art joint driving apparatus, a linear motor is used to generate the relative movement between first and second members on the joint, and a stator structure of the linear motor is similar to that of the rotational motor.

OBJECT AND SUMMARY OF THE INVENTION

An object of the present invention is to provide a joint driving apparatus for generating a relative movement between first and second members on a joint, by which apparatus a magnetic flux is effectively utilized to generate a force for urging the first and second members with respect to each other.

According to the invention, in a joint driving apparatus for generating a relative movement between first and second members on a joint, comprising, a linear motor including at least one stator part fixed to another one of the first and second members, a movable element movable with respect to the stator part in a movable direction and connected to the one of the first and second members to be moved with respect to the another one of the first and second members, and an electromagnetic coil device for energizing the stator part to be magnetized so that a magnetic field for urging the movable element in the movable direction with respect to the stator part is generated, the stator part includes at least two pairs of magnetic poles, the at least two pairs are adjacent to each other in the movable direction, the magnetic poles of each of the at least two pairs face to each other through the movable element in a traverse direction perpendicular to the movable direction to generate the magnetic field passing the magnetic poles through the movable element, and a magnetic polar direction of one of the at least two pairs is opposite to that of another one of the at least two pairs adjacent to the one of the at least two pairs in the movable direction when the stator part is magnetized.

Since the magnetic poles of each of the at least two pairs face to each other through the movable element in a traverse direction perpendicular to the movable direction to generate the magnetic field passing the magnetic poles through the movable element, and a magnetic polar direction of one of the at least two pairs is opposite to that of another one of the at least two pairs adjacent to the one of the at least two pairs in the movable direction when the stator part is magnetized, a magnetic flux is effectively utilized to generate a force for urging the first and second members with respect to each other.

The joint driving apparatus may further comprise a sensor for generating a signal corresponding to an actual movement of the movable element with respect to the stator part, wherein the electromagnetic coil device controls a change in energized phase of the stator part on the basis of a comparison between the signal and an instructed movement of the movable element with respect to the stator parts to form a closed-loop control system. The electromagnetic coil device may control a change in energized phase of the stator part on the basis of an instructed movement of the movable element with respect to the stator part to form an open-loop control system. An actual movement of the movable element with respect to the stator part may be estimated from a voltage induced in the electromagnetic coil device by the actual movement of the movable element or from an electric current flowing through the electromagnetic coil device.

When the apparatus comprises at least two of the stator parts, the electromagnetic coil device energizes the at least two stator parts respectively to be magnetized with a difference in energized phase between the at least two stator parts so that a travelling magnetic field for urging the movable element in the movable direction is generated by a cooperation between the at least two stator parts, P is a pitch of the pairs of the magnetic poles adjacent to each other in the movable direction in each of the stator parts, k is an integral number not less than zero, and M is a number of the stator parts energized with respective energized phases different from each other while M is an integral number not less than two, a distance between the pair of magnetic poles of one of the stator parts and the pair of magnetic poles of another one of the stator parts adjacent to each other in the movable direction=(k*P)+(P/M).

The joint driving apparatus may further comprise an elastic member a part of which is connected to one of the first and second members, wherein the movable element is connected to another part of the elastic member to drive the one of the first and second members through the elastic member with respect to the another one of the first and second members. The apparatus may comprise a plurality of pairs of the elastic members and linear motors while the relative movement between the first and second members is performed along each of directions different from each other by respective one of the pairs of the elastic members and linear motors. The apparatus may comprise a plurality of the elastic members while the relative movement between the first and second members is performed along each of directions different from each other by respective one of the elastic members connected selectively to the linear motor. The joint driving apparatus may further comprise a dust cover covering a portion of the movable element projecting from the stator parts. The joint driving apparatus may further comprise a cooling device for cooling the linear motor. The joint driving apparatus may further comprise a switching device for switching, between a battery and an outer electric power source, an electric power supply source for supplying an electric power to the linear motor. The joint driving may further comprise a spring member for urging the movable element with respect to the another one of the first and second members in the movable direction. The elastic member may include a spring for connecting elastically between the movable element and the one of the first and second members. The elastic member may include a rubber for connecting elastically between the movable element and the one of the first and second members.

When first one of the magnetic poles of each of the at least two pairs faces to a first side surface of the movable element, second one of the magnetic poles of each of the at least two pairs faces to a second side surface of the movable element opposite to the first side surface in the traverse direction, a magnetic polar direction between the first one of the magnetic poles of one of the at least two pairs and the second one of the magnetic poles of the one of the at least two pairs is opposite to a magnetic polar direction between the first one of the magnetic poles of another one of the at least two pairs and the second one of the magnetic poles of the another one of the at least two pairs, and the at least two pairs is magnetized by single electromagnetic coil, a number of electromagnetic coils for the linear motor is minimized.

When first one of the magnetic poles of each of the at least two pairs faces to a first side surface of the movable element, second one of the magnetic poles of each of the at least two pairs faces to a second side surface of the movable element opposite to the first side surface in the traverse direction, the stator part has a magnetic core and the electromagnetic coil device has an electromagnetic coil surrounding an intermediate portion of the magnetic core between longitudinal ends of the magnetic core to generate a magnetic field passing the longitudinal ends of the magnetic core so that the at least two pairs of magnetic poles are energized by the electromagnetic coil, and one of the longitudinal ends of the magnetic core forms both of the first one of the magnetic poles of the one of the at least two pairs and the second one of the magnetic poles of the another one of the at least two pairs while another one of the longitudinal ends of the magnetic core forms both of the first one of the magnetic poles of the another one of the at least two pairs and the second one of the magnetic poles of the one of the at least two pairs, a size of the magnetic core is minimized.

When the apparatus comprises at least two of the stator parts energized respectively to be magnetized with a difference in energized phase between the at least two stator parts so that a travelling magnetic field for urging the movable element in the movable direction is generated by a cooperation between the at least two stator parts, and each of the stator parts is magnetized by single electromagnetic coil, a number of electromagnetic coils for the linear motor is minimized.

When the apparatus comprises at least two of the stator parts energized respectively to be magnetized with a difference in energized phase between the at least two stator parts so that a travelling magnetic field for urging the movable element in the movable direction is generated by a cooperation between the at least two stator parts, and the at least two pairs of magnetic poles in one of the stator parts is energized by single electromagnetic coil and the at least two pairs of magnetic poles in another one of the stator parts is energized by another single electromagnetic coil, a number of electromagnetic coils for the linear motor is minimized. When the stator part is magnetized by single electromagnetic coil, a number of electromagnetic coils for the linear motor is minimized.

DETAILED DESCRIPTION OF PREFERRED EMBODIMENTS

Figure 1:
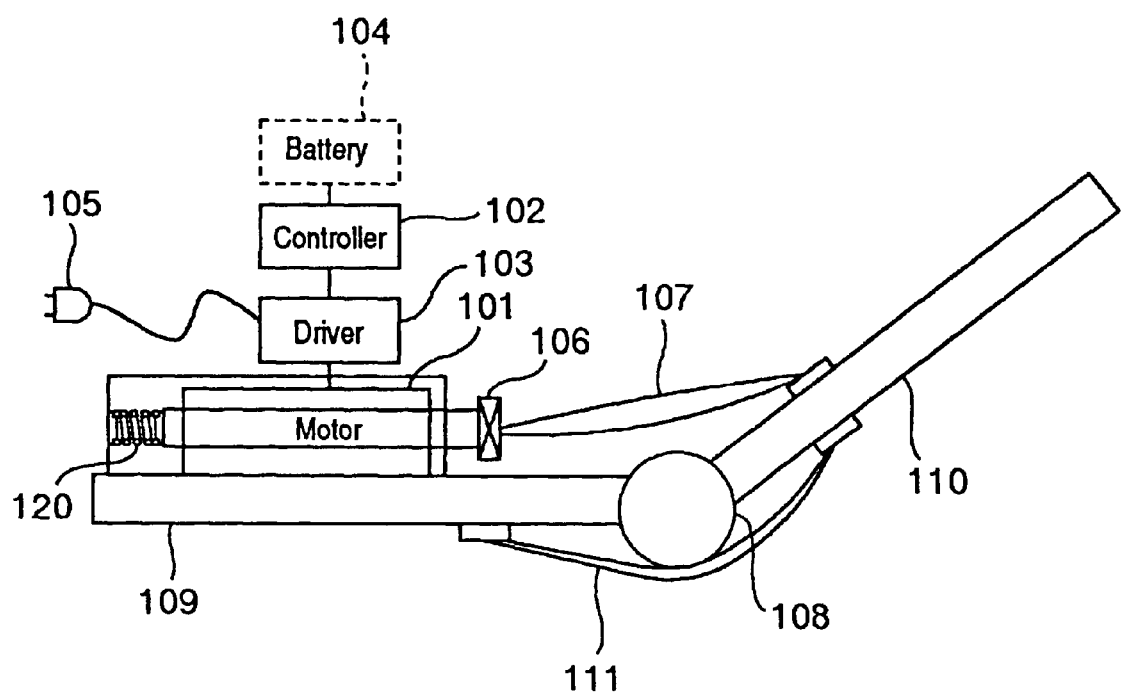
FIG. 1 is a schematic view showing a joint driving apparatus including a linear motor of the invention.

As shown in FIG. 1, a linear motor 101 has a controller 102, an electric driver 103, a battery 104, an electric source line 105, a connector 106, a swingable joint 108, first and second members 109 and 110 swingable with respect to each other on the joint 106, an elastic member 107 of spring or rubber whose one end is connected to a movable element through the connector 106, whose another end is connected to the second member 110 and which has an elastic characteristic for movement similar to muscle, and another elastic member 111 of spring or rubber whose one end is connected to the first member, whose another end is connected to the second member 110 and which has an elastic characteristic for movement similar to muscle.

Figure 17:
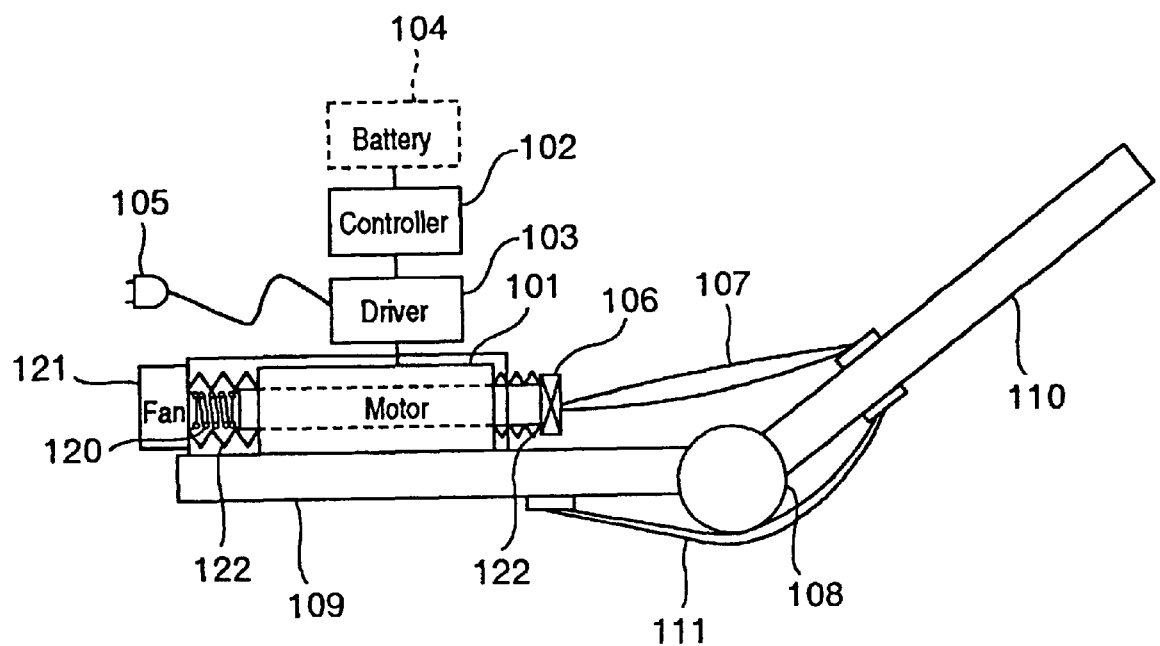
FIG. 17 is a schematic view showing another joint driving apparatus including a linear motor of the invention.

An electric power may be supplied to the linear motor 101 from either the battery 104 or electric source line 105. At least one of the battery 104 and electric source line 105 may be detachable. A spring 120 may be arranged between the first member 109 and the movable element as a damper. As shown in FIG. 17, the linear motor 101 may has a cooling device 121 and/or a dust cover 122 for covering a portion of the movable element projecting from a stator. The cooling device 121 may be a motor drive fan or cooling fin.

Figure 2A:
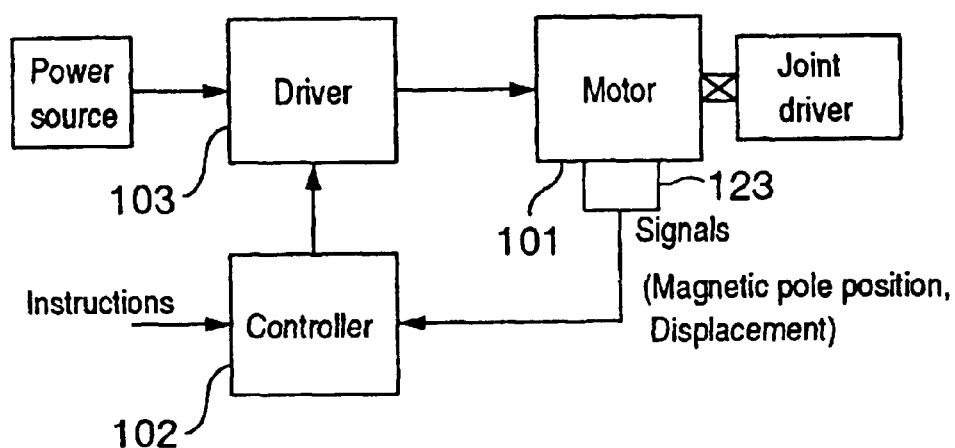
FIG. 2a is a block diagram showing a control system of the joint driving apparatus.

As shown in FIG. 2a, a closed-loop control system may be formed by a sensor 123 for measuring the relative movement of the movable member and the stator and/or a positional relationship between magnetic poles on the movable member and magnetic poles on the stator, the controller 102 receiving signals from the sensor 123 and the power driver 103.

Figure 2B:
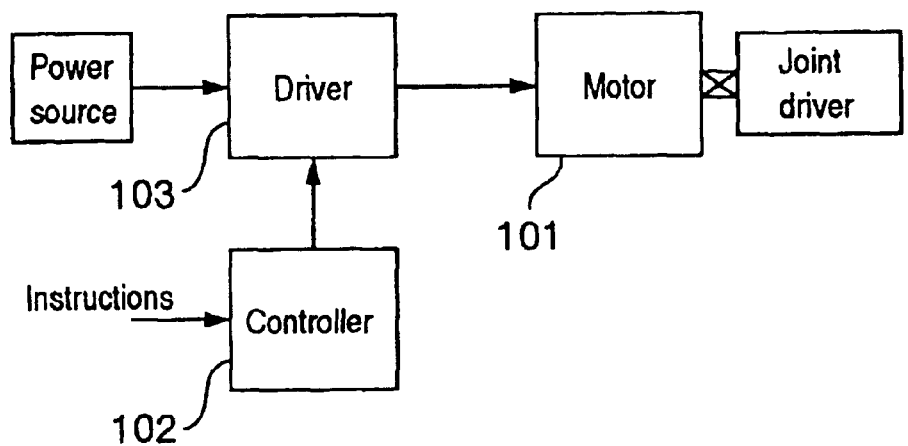
FIG. 2b is a block diagram showing another control system of the joint driving apparatus.

As shown in FIG. 2b, an open-loop control system may be formed by the linear motor 101, the controller 102 and the power driver 103.

Figure 3A:
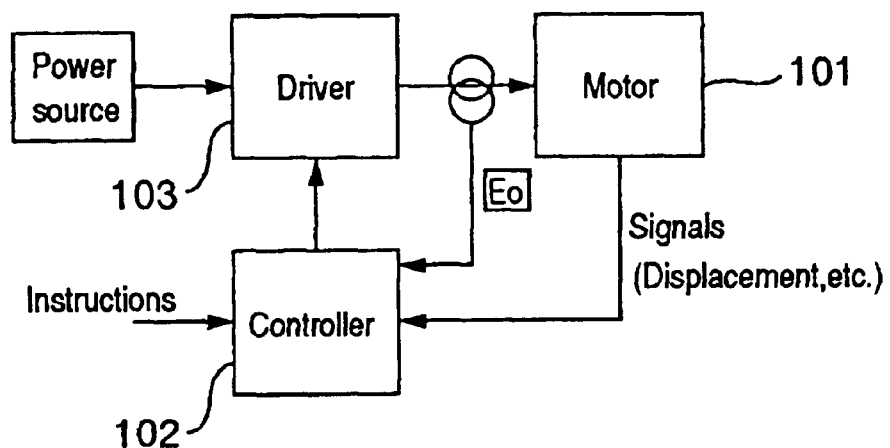
FIG. 3a is a block diagram showing another control system of the joint driving apparatus.

As shown in FIG. 3a, the power driver 103 may be controlled on the basis of the positional relationship between magnetic poles on the movable member and magnetic poles on the stator estimated in the controller 102 from an induced voltage E0 generated by the linear motor 101.

Figure 3B:
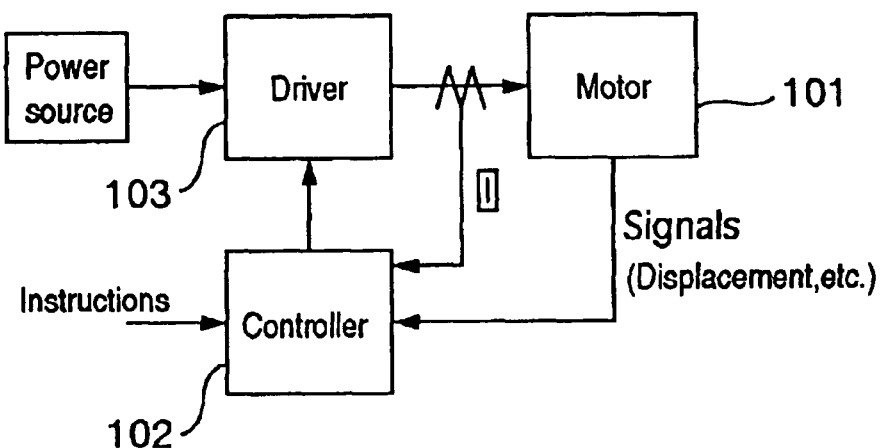
FIG. 3b is a block diagram showing another control system of the joint driving apparatus.

As shown in FIG. 3b, the power driver 103 may be controlled on the basis of the positional relationship between magnetic poles on the movable member and magnetic poles on the stator estimated in the controller 102 from the induced voltage E0 calculated from a voltage and a measured electric current supplied to the linear motor 101.

Figure 4:
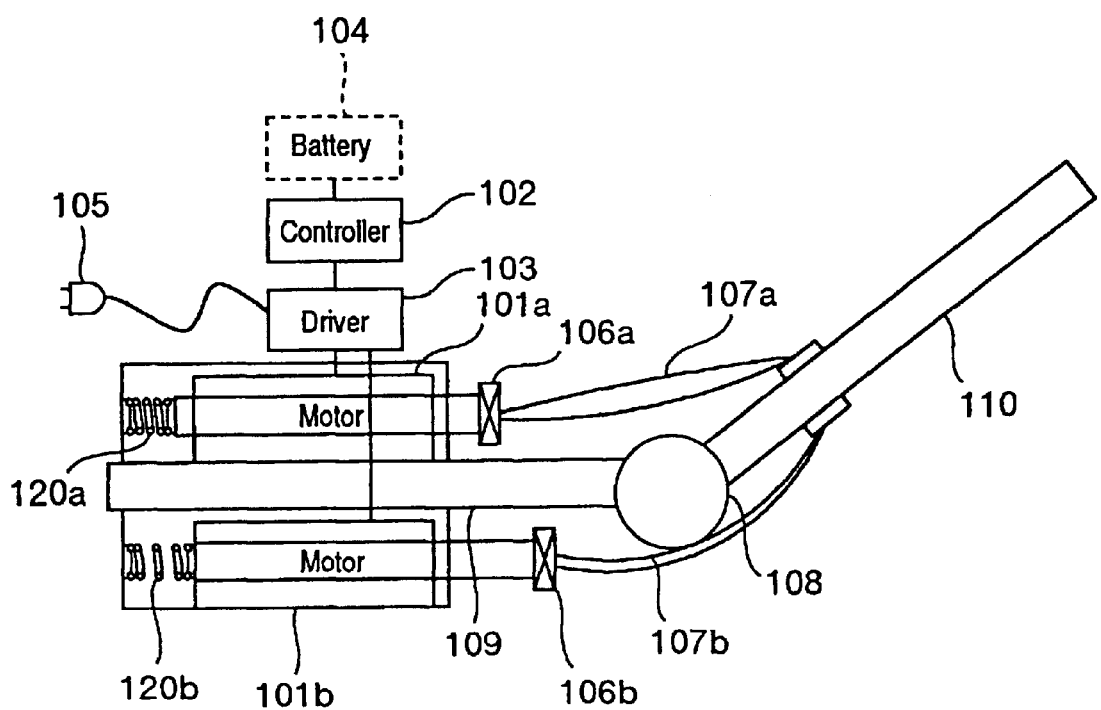
FIG. 4 is a schematic view showing another joint driving apparatus including a linear motor of the invention.
Figure 5A:
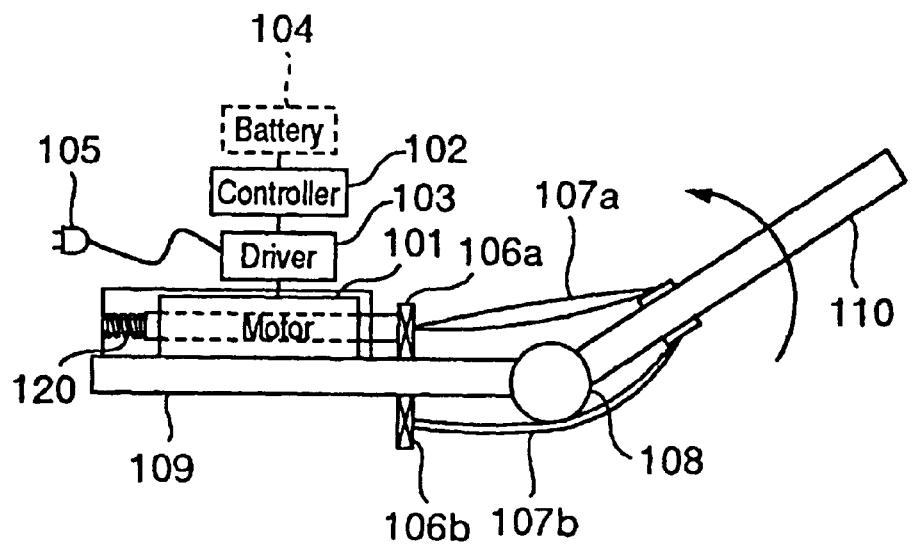
FIG. 5 is a schematic view showing another joint driving apparatus including a linear motor of the invention.
Figure 5B:
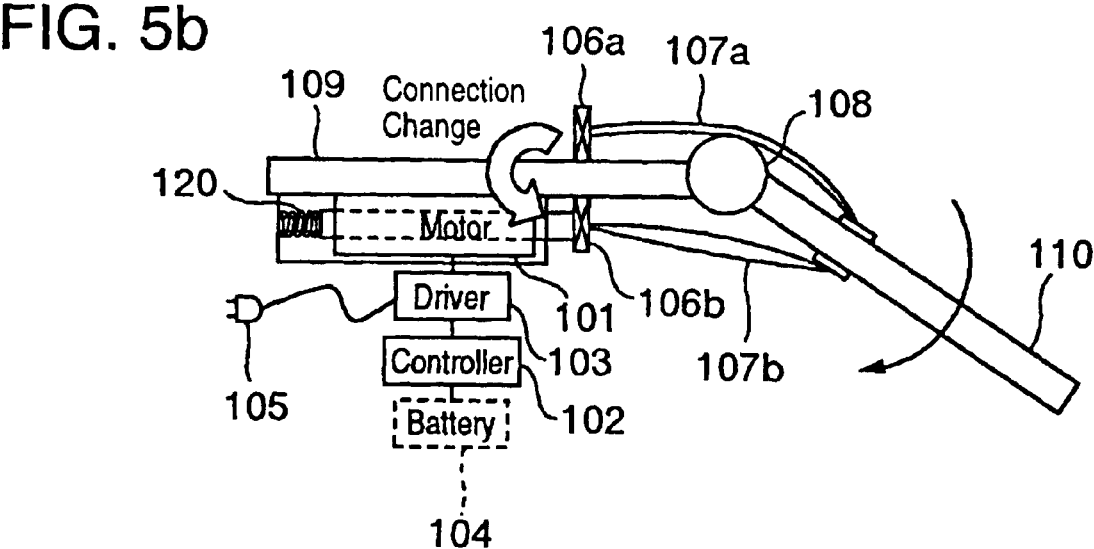

As shown in FIG. 4, a relative movement between the first and second members may be brought about by a pair of the linear motors 101. As shown in FIG. 5, the linear motors 101 may be selectively connected to one of the elastic members 107a and 107b to drive the second member 110 in either direction.

Figure 6A:
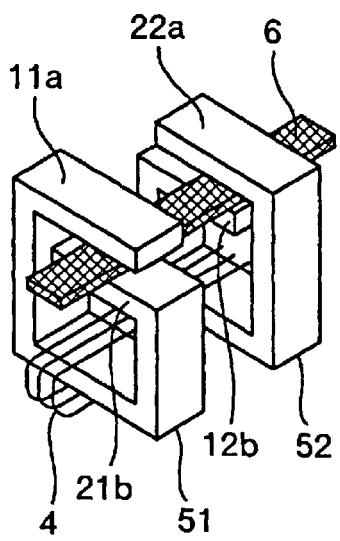
FIG. 6a is a schematic oblique projection view showing a stator drive unit of a linear motor of the invention.
Figure 6B:
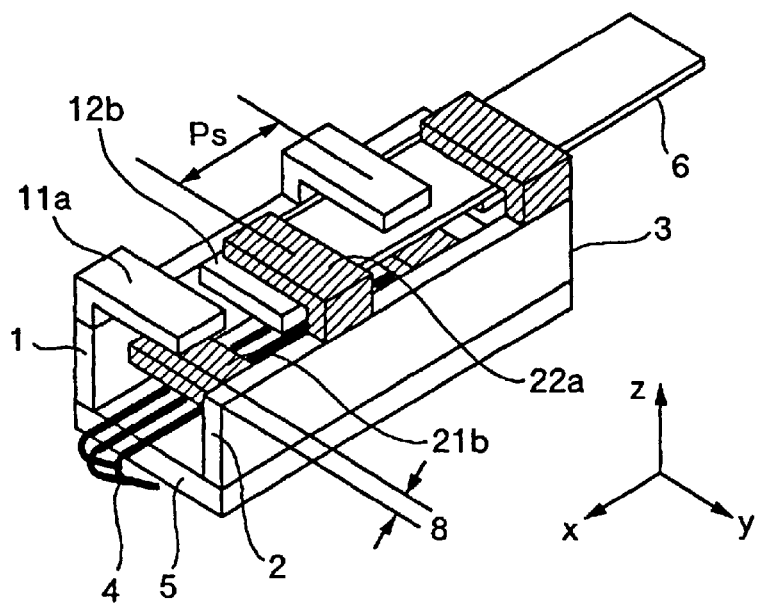
FIG. 6b is a schematic oblique projection view showing another stator drive unit of a linear motor of the invention.

As shown in FIGS. 6a and 6b, a first magnetic core 51 forms a first pair of magnetic poles 11a and 21b, and a second magnetic core 52 forms a second pair of magnetic poles 12b and 22a. A (2n−1)th magnetic core has the first pair of magnetic poles 11a and 21b and a (2n)th magnetic core has the second pair of magnetic poles 12b and 22a when n=1, 2, 3, - - - . The first magnetic core 51 and second magnetic core 52 are surrounded by a single electromagnetic coil 4. A movable member 6 including pairs of magnetic poles whose pitch Pm is equal to a pitch Ps between the first magnetic cores 51 and 52 adjacent to each other in a movable direction of the movable member 6 is movable in a gap 8 between the magnetic poles 11a and 21b of the first magnetic core 51 and between the magnetic poles 12b and 22a of the second magnetic core 52. The magnetic poles of the movable member 6 are formed by permanent magnets, electromagnetic coils and/or differences in magnetic conductivity relative to the magnetic cores along the movable direction. Magnetic polar directions of the first and second magnetic cores 51 and 52 adjacent to each other in the movable direction are opposite to each other.

Figure 7A:
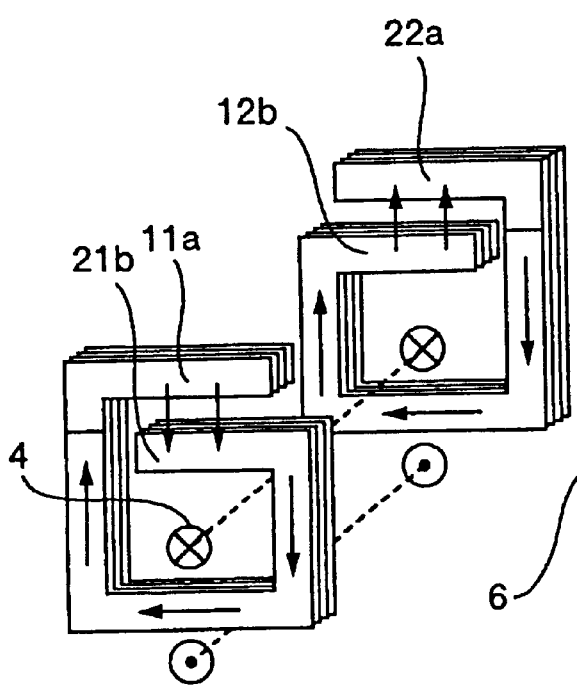
FIG. 7a is a schematic oblique projection view showing a magnetic core unit of a linear motor of the invention.
Figure 7B:
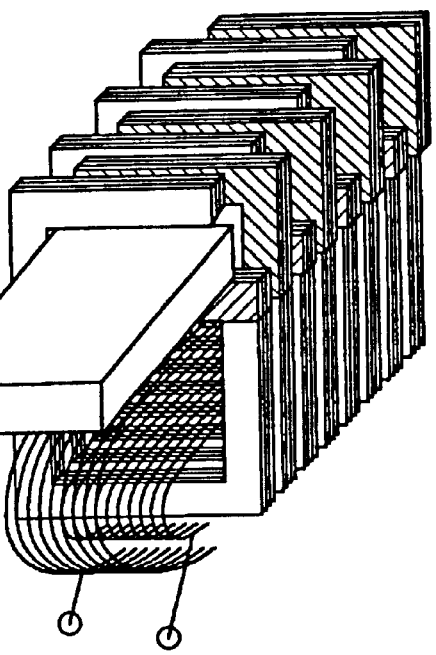
FIG. 7b is a schematic oblique projection view showing a magnetic core assembly of a linear motor of the invention.

As shown in FIGS. 7a and 7b, since a drawing force between the movable member 6 and the magnetic poles 11a and 22a is substantially equal to a drawing force between the movable member 6 and the magnetic poles 21b and 12b, a drawing force between the movable member 6 and the magnetic cores 51 and 52 is decreased. The magnetic cores 51 and 52 may be formed by a stack of steel plates.

Figure 8A:
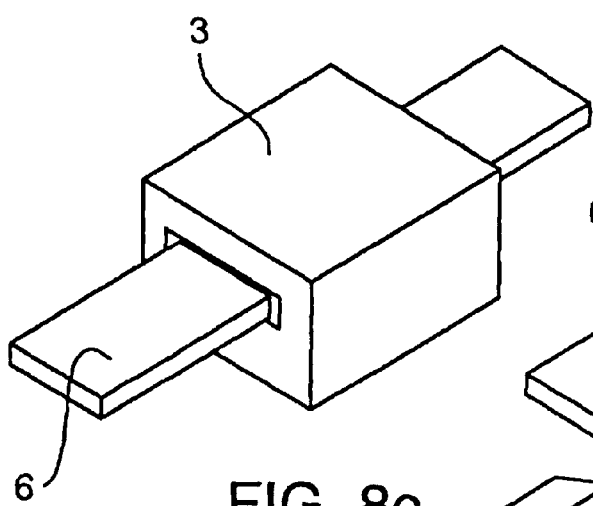
FIG. 8a is a schematic oblique projection view showing an outer shape of a linear motor of the invention.
Figure 8B:
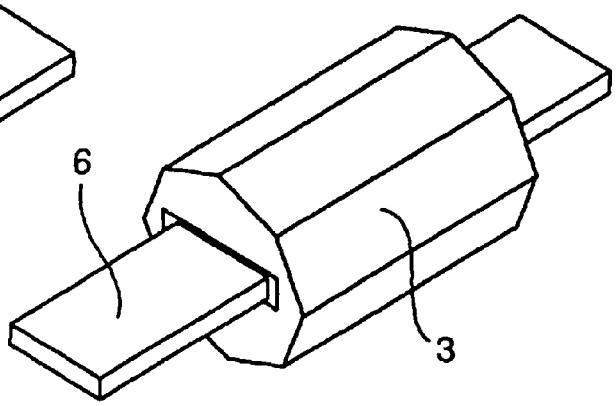
FIG. 8b is a schematic oblique projection view showing an outer shape of another linear motor of the invention.
Figure 8C:
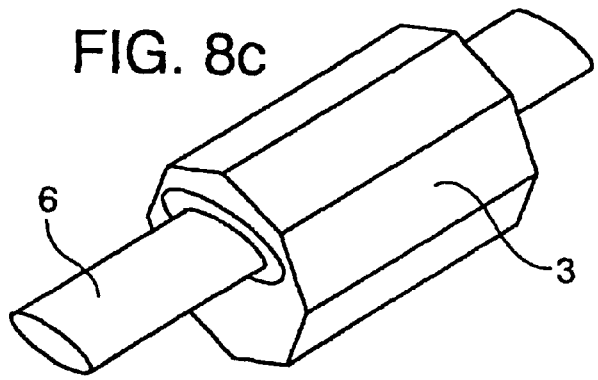
FIG. 8c is a schematic oblique projection view showing an outer shape of another linear motor of the invention.
Figure 12:
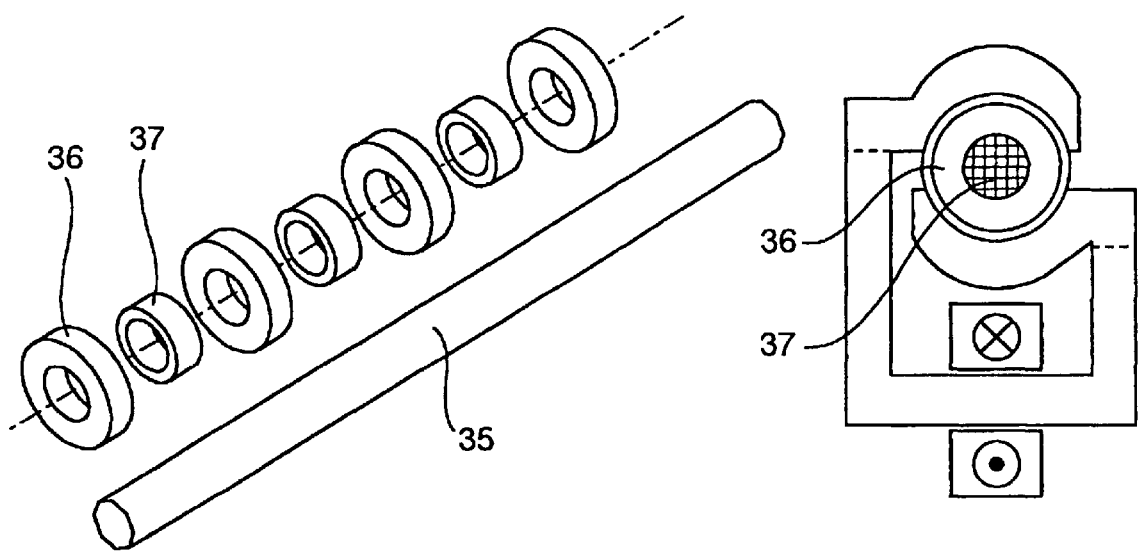
FIG. 12 is a schematic view showing another movable element of the invention, and a stator usable therefor.

As shown in FIGS. 8a, 8b and 8c, a stator 3 including the magnetic cores 51 and 52 and the electromagnetic coil 4 may be contained by various shape molded plastic. The movable member 6 may be rectangular or cylindrical as shown in FIG. 12.

Figure 9:
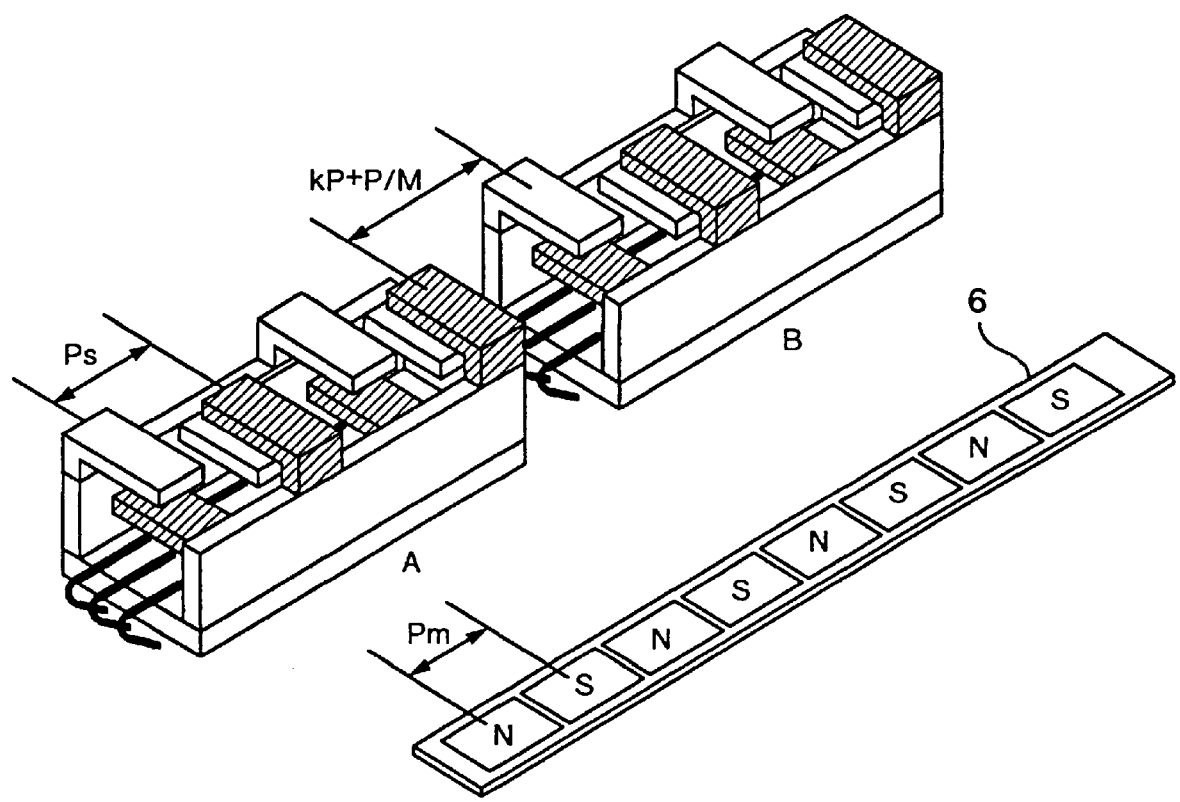
FIG. 9 is a schematic oblique projection view showing stator parts of the invention arranged in series and a movable element driven on the stator parts.
Figure 14:
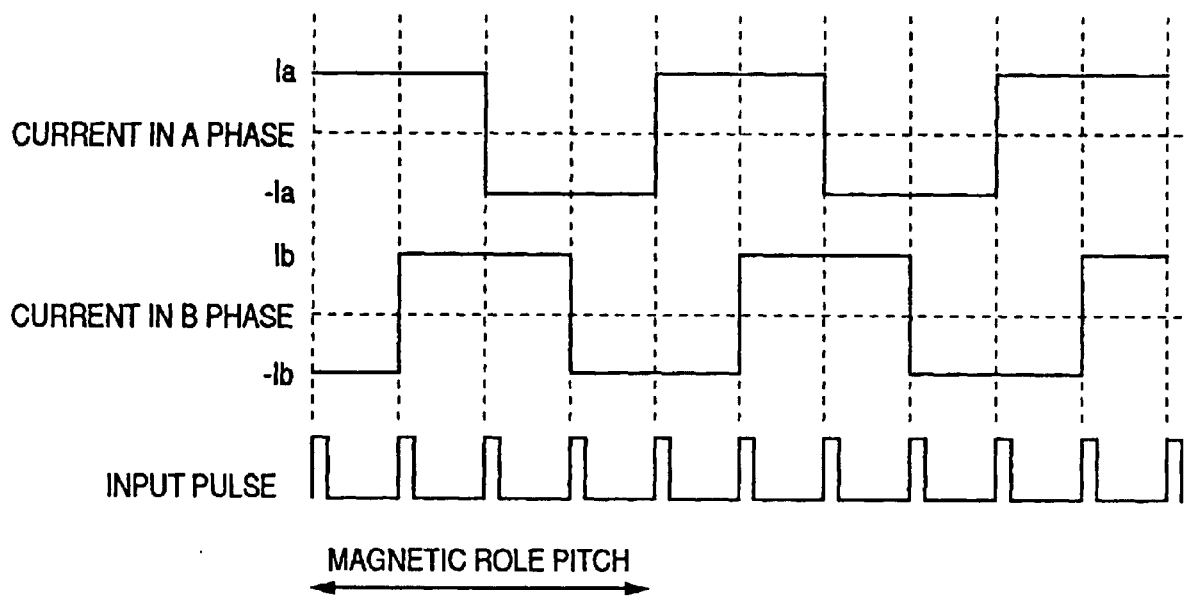
FIG. 14 is a diagram showing a relation ship between input instruction pulses, a proceeding of movable element, and electric current phases for energizing stator parts respectively, in a two-phases linear motor.
Figure 15:
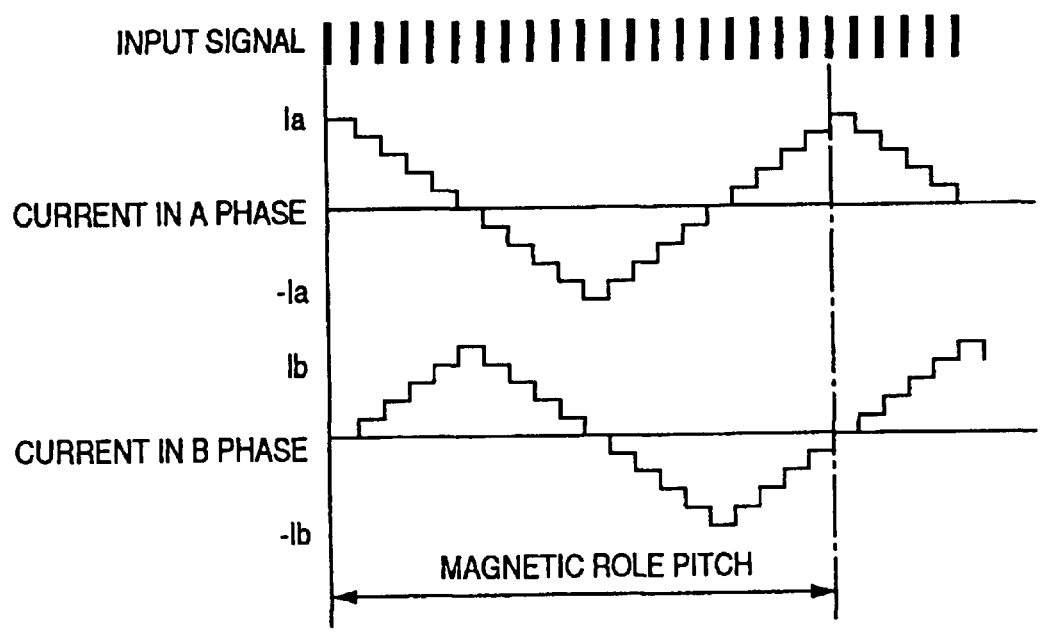
FIG. 15 is a diagram showing another relation ship between input instruction pulses, a proceeding of movable element, and electric current phases for energizing stator parts respectively, in the two-phases linear motor.
Figure 16:
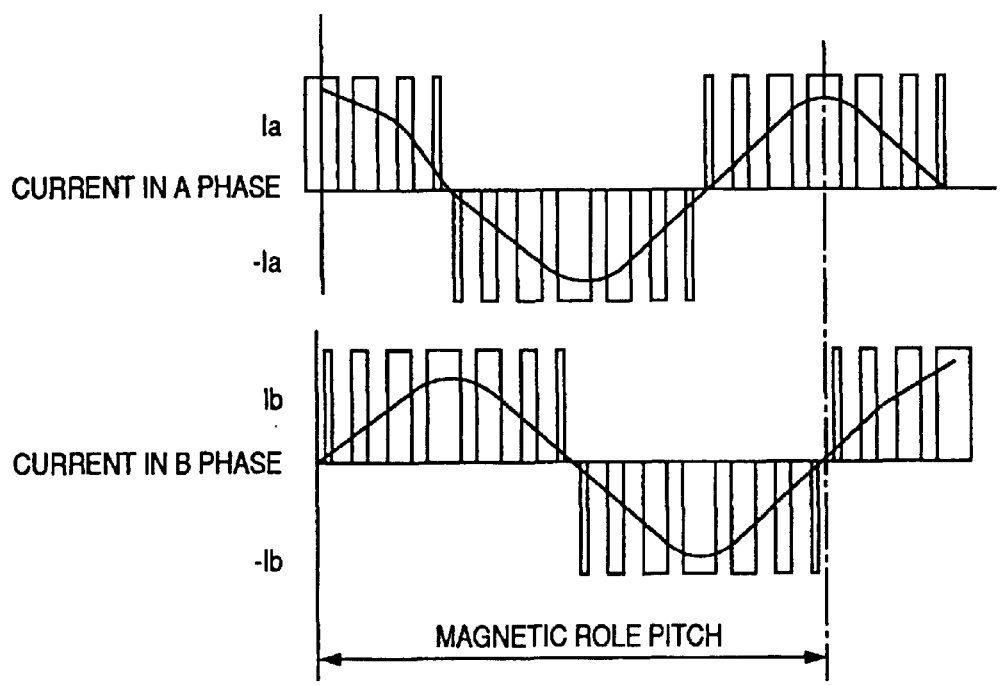
FIG. 16 is a diagram showing another relation ship between input instruction pulses, a proceeding of movable element, and electric current phases for energizing stator parts respectively, in the two-phases linear motor.

As shown in FIG. 9, the stator 3 has stator parts A and B arranged in series each of which stator parts includes the magnetic cores 51 and 52 and the electromagnetic coil 4 and which are energized to be magnetized respectively with a difference in energized phase between the stator parts A and B so that a travelling magnetic field for urging the movable element 6 in the movable direction is generated by a cooperation between the stator parts A and B. As shown in FIGS. 14–16, the difference in energized phase between the stator parts A and B is π/2 when the linear motor is a two phase linear motor. As shown in FIG. 15, an electric current supplied to each of the stator parts A and B may be changed along a sine curve. As shown in FIG. 16, the electric current supplied to each of the stator parts A and B may changed by changing a pulse width of voltage or current to be supplied.

Figure 10:
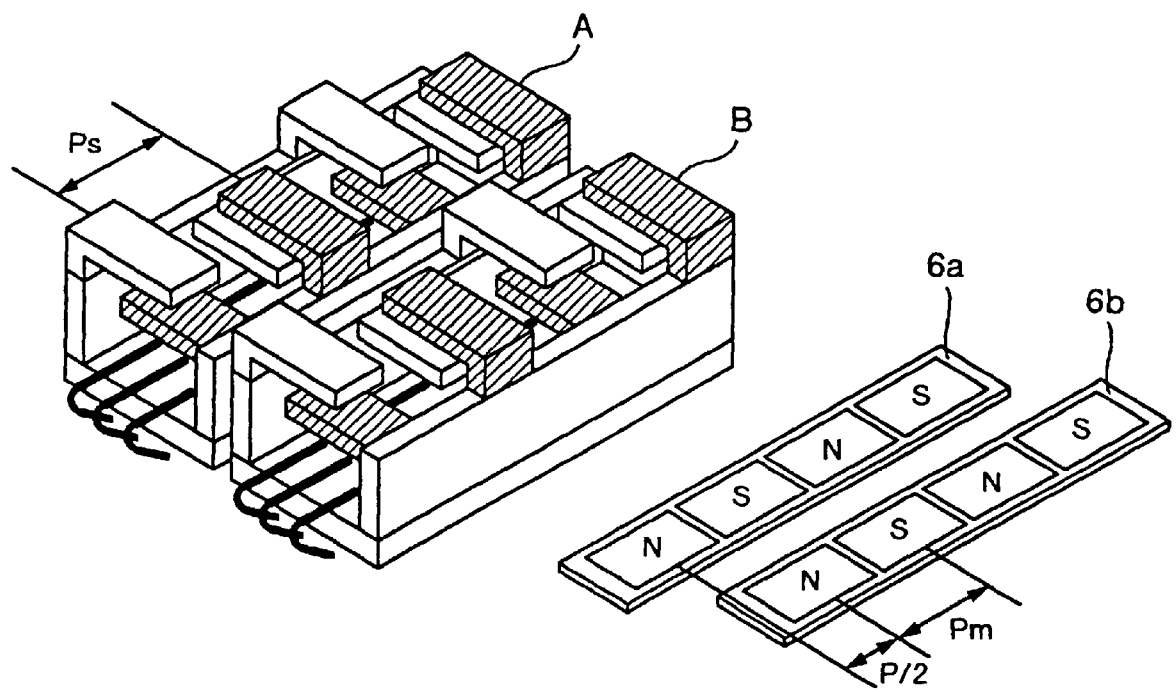
FIG. 10 is a schematic oblique projection view showing stator parts of the invention arranged in parallel and a movable element driven on the stator parts.

As shown in FIG. 10, the stator parts A and B may be arranged in parallel, and the movable members 6 may be arranged in parallel. The movable members 6 arranged in parallel may be one-piece. As a matter of course, the linear motor may be three, four or five phase linear motor.

A distance between the pair of magnetic poles of one of the stator parts and the pair of magnetic poles of another one of the stator parts adjacent to each other in the movable direction=(k*P)+(P/M), when P is a pitch Ps of the pairs of the magnetic poles of the stator parts A and B adjacent to each other in the movable direction in each of the stator parts and a pitch Pm of the magnetic poles of the movable member 6 adjacent to each other in the movable direction, k is an integral number not less than zero, and M is a number of the stator parts energized with respective energized phases different from each other while M is an integral number not less than two.

Figure 11:
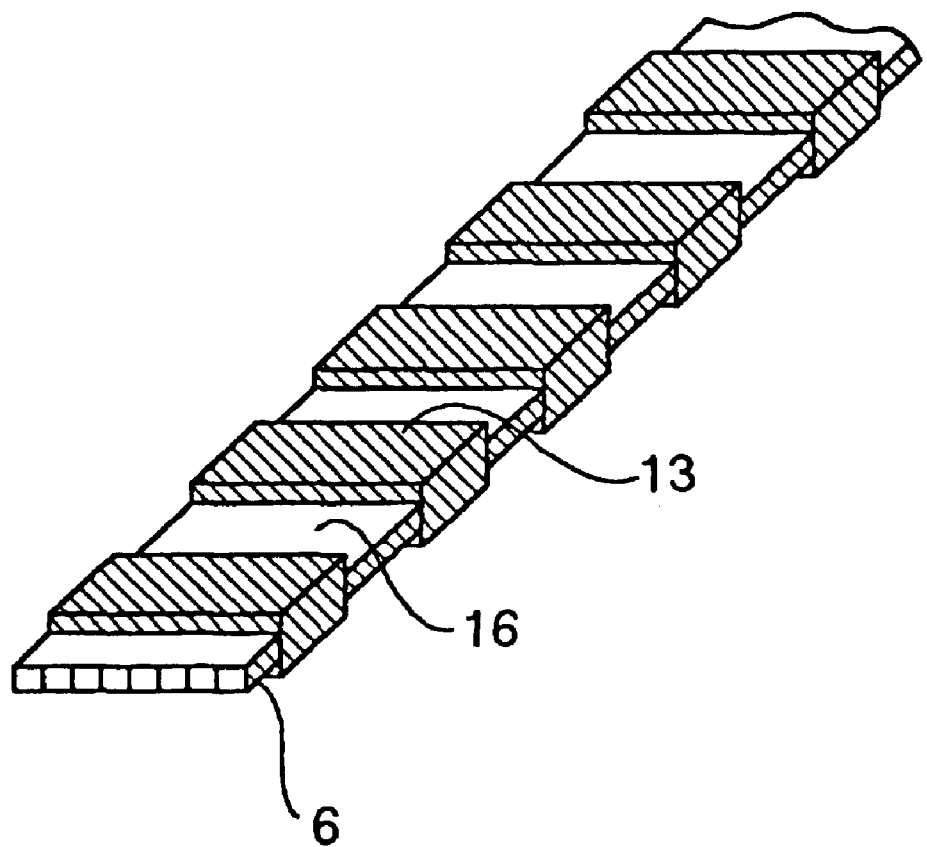
FIG. 11 is a schematic oblique projection view showing another movable element of the invention.

As shown in FIG. 11, the movable member 6 may have a base band 16 and magnetically conductive protrusions 13 to change a reluctance between the movable member 6 and the magnetic cores 51 and 52 in a longitudinal direction of the movable member 6. The magnetically conductive protrusions 13 may be magnetized by permanent magnets on the movable member 6. The base band 16 may be non-magnetically permeable.

As shown in FIG. 12, the movable member 6 may be formed by a rod 35, high-magnetic-conductivity large diameter rings 36 and low-magnetic-conductivity small diameter rings 37. The rings 36 may include permanent magnets. Surfaces of the magnetic cores 51 and 52 are curved along outer surfaces of the high-magnetic-conductivity large diameter rings 36.

Figure 13:
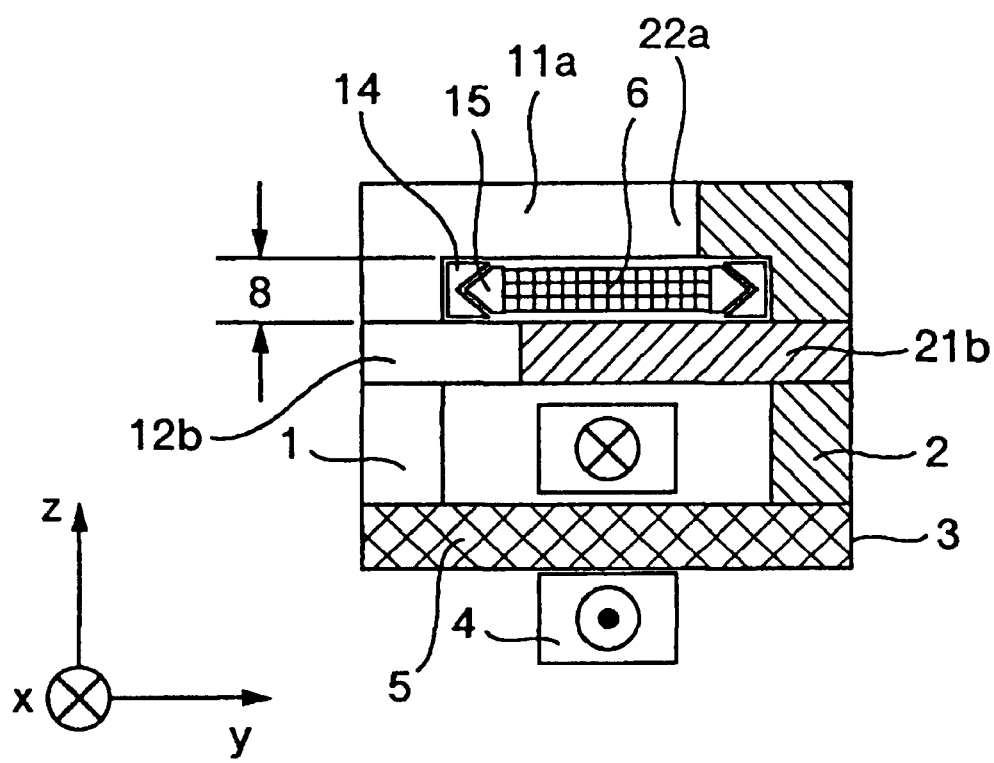
FIG. 13 is a partially cross-sectional view showing another linear motor of the invention.

As shown in FIG. 13, the magnetic cores 51 and 52 may have slide supports 14, and the movable member 6 may have a slider 15 which can slide on the slide supports 14 with low friction.

What is claimed is:

1. A joint driving apparatus for generating a relative movement between first and second members on a joint, comprising:
    a linear motor including:
        at least one stator part fixed to the other one of the first and second members,
        a movable element movable with respect to the stator part in a movable direction and connected to the one of the first and second members to be moved with respect to the other one of the first and second members, and
        an electromagnetic coil device for energizing the stator part to be magnetized so that a magnetic field for urging the movable element in the movable direction with respect to the stator part is generated;
    wherein the stator part includes at least two pairs of magnetic poles, the at least two pairs are adjacent to each other in the movable direction and magnetized simultaneously with the identical common magnetizing phase by the electromagnetic coil device, the magnetic poles of each of the at least two pairs face to each other through the movable element in a movable element thickness direction perpendicular to the movable direction to generate the magnetic field passing the magnetic poles through the movable element in the movable element thickness direction, and a magnetic polar direction of one of the at least two pairs is opposite to that of the other one of the at least two pairs adjacent to the one of the at least two pairs in the movable direction when the stator part is magnetized.

2. A joint driving apparatus comprising a linear motor for generating a relative movement between first and second members on a joint;
   wherein the linear motor includes a stator and a movable member;
   wherein the stator includes:
      a first core part including first opposed parts which oppose each other through a first gap, and
      a second core part including second opposed parts which oppose each other through a second gap;
   wherein the first core part and the second core part include a common coil;
   wherein a magnetic polarity of the first opposed parts is different from a magnetic polarity of the second opposed parts;
   wherein the first core part and the second core part are disposed alternately; and
wherein the movable member is disposed in the first gap and the second gap.

3. A joint driving apparatus according to claim 2, further comprising a sensor for generating a signal corresponding to an actual movement of the movable element with respect to the stator part, wherein the electromagnetic coil device controls a change in energized phase of the stator part on the basis of a comparison between the signal and an instructed movement of the movable element with respect to the stator part to form a closed-loop control system.

4. A joint driving apparatus according to claim 2, wherein the electromagnetic coil device controls a change in energized phase of the stator part on the basis of an instructed movement of the movable element with respect to the stator part to form an open-loop control system.

5. A joint driving apparatus according to claim 2, wherein an actual movement of the movable element with respect to the stator part is estimated from a voltage induced in the electromagnetic coil device by the actual movement of the movable element.

6. A joint driving apparatus according to claim 2, wherein an actual movement of the movable element with respect to the stator part is estimated from an electric current flowing through the electromagnetic coil device.

7. A joint driving apparatus according to claim 2, further comprising at least two of the stator parts, the electromagnetic coil device energizes the at least two stator parts respectively to be magnetized with a difference in energized phase between the at least two stator parts so that a traveling magnetic field for urging the movable element in the movable direction is generated by a cooperation between the at least two stator parts, a distance between the pair of magnetic poles of one of the stator parts and the pair of magnetic poles of the other one of the stator parts adjacent to each other in the movable direction=(k*P)+(P/M), when P is a pitch of the pairs of the magnetic poles adjacent to each other in the movable direction in each of the stator parts, k is an integral number not less than zero, and M is a number of the stator parts energized with respective energized phases different from each other while M is an integral number not less than two.

8. A joint driving apparatus according to claim 2, further comprising a dust cover covering a portion of the movable element projecting from the stator part.

9. A joint driving apparatus according to claim 2, further comprising a cooling device for cooling the linear motor.

10. A joint driving apparatus according to claim 2, further comprising a switching device for switching, between a battery and an outer electric power source, an electric power supply source for supplying an electric power to the linear motor.

11. A joint driving apparatus according to claim 2, further comprising at least two of the stator parts that are energized respectively to be magnetized with a difference in energized phase between the at least two stator parts so that a traveling magnetic field for urging the movable element in the movable direction is generated by a cooperation between the at least two stator parts, and each of the stator parts is magnetized by a single electromagnetic coil.

12. A joint driving apparatus according to claim 2, further comprising at least two of the stator parts that are energized respectively to be magnetized with a difference in energized phase between the at least two stator parts so that a traveling magnetic field for urging the movable element in the movable direction is generated by a cooperation between the at least two stator parts, the at least two pairs of magnetic poles in one of the stator parts is energized by single electromagnetic coil and the at least two pairs of magnetic poles in the other one of the stator parts is energized by another single electromagnetic coil.

13. A joint driving apparatus for generating a relative movement between first and second members on a joint, comprising:
   a linear motor including:
      at least one stator part fixed to the other one of the first and second members,
      a movable element movable with respect to the stator part in a movable direction and connected to the one of the first and second members to be moved with respect to the other one of the first and second members, and
      an electromagnetic coil device for energizing the stator part to be magnetized so that a magnetic field for urging the movable element in the movable direction with respect to the stator part is generated;
   wherein the stator part includes at least two pairs of magnetic poles, the at least two pairs are adjacent to each other in the movable direction, the magnetic poles of each of the at least two pairs face to each other through the movable element in a traverse direction perpendicular to the movable direction to generate the magnetic field passing the magnetic poles through the movable element, and a magnetic polar direction of one of the at least two pairs is opposite to that of the other one of the at least two pairs adjacent to the one of the at least two pairs in movable direction when the stator part is magnetized;
   wherein the joint driving apparatus further comprises an elastic member a part of which is connected to one of the first and second members; and
   wherein the movable element is connected to another part of the elastic member to drive the one of the first and second members through the elastic member with respect to the another one of the first and second members.

14. A joint driving apparatus according to claim 13, further comprising a plurality of pairs of the elastic members and linear motors, wherein the relative movement between the first and second members is performed along each of directions different from each other by respective one of the pairs of the elastic members and linear motors.

15. A joint driving apparatus according to claim 13, further comprising a plurality of the elastic members, wherein the relative movement between the first and second members is performed along each of directions different from each other by respective one of the elastic members connected selectively to the linear motor.

16. A joint driving apparatus according to claim 13, wherein the elastic member includes a spring for connecting elastically between the movable element and the one of the first and second members.

17. A joint driving apparatus according to claim 13, wherein the elastic member includes a rubber for connecting elastically between the movable element and the one of the first and second members.

18. A joint driving apparatus apparatus for generating a relative movement between first and second members on a joint, comprising a linear motor including:

at least one stator part fixed to the other one of the first and second members, a movable element movable with respect to the stator part in a movable direction and connected to the one of the first and second members to be moved with respect to the other one of the first and second members, and an electromagnetic coil device for energizing the stator part to be magnetized so that a magnetic field for urging the movable element in the movable direction with respect to the stator part is generated;

wherein the stator part includes at least two pairs of magnetic poles, the at least two pairs are adjacent to each other in the movable direction, the magnetic poles of each of the at least two pairs face to each other through the movable element in a traverse direction perpendicular to the movable direction to generate the magnetic field passing the magnetic poles through the movable element, and a magnetic polar direction of one of the at least two pairs is opposite to that of the other one of the at least two pairs adjacent to the one of the at least two pairs in the movable direction when the stator part is magnetized; and wherein the joint driving apparatus further comprises a spring member for urging the movable element with respect to the other one of the first and second members in the movable direction.

19. A joint driving apparatus for generating a relative movement between first and second members on a joint, comprising a linear motor including:

at least one stator part fixed to the other one of the first and second members, a movable element movable with respect to the stator part in a movable direction and connected to the one of the first and second members to be moved with respect to the other one of the first and second members, and an electromagnetic coil device for energizing the stator part to be magnetized so that a magnetic field for urging the movable element in the movable direction with respect to the stator part is generated;

wherein the stator part includes at least two pairs of magnetic poles, the at least two pairs are adjacent to each other in the movable direction, the magnetic poles of each of the at least two pairs face to each other through the movable element in a traverse direction perpendicular to the movable direction to generate the magnetic field passing the magnetic poles through the movable element, and a magnetic polar direction of one of the at least two pairs is opposite to that of the other one of the at least two pairs adjacent to the one of the at least two pairs in the movable direction when the stator is magnetized; and wherein a first one of the magnetic poles of each of the at least two pairs faces to a first surface of the movable element, a second one of the magnetic poles of each of the at least two pairs faces to a second side surface of the movable element opposite to the first side surface in the traverse direction, a magnetic polar direction between the first one of the magnetic poles of the at least two pairs and the second one of the magnetic poles of the one of the at least two pairs is opposite to a magnetic polar direction between the first one of the magnetic poles of the other one of the at least two pairs, and the at least two pairs is magnetized by single electromagnetic coil.

20. A joint driving apparatus for generating a relative movement between first and second members on a joint, comprising a linear motor including:

at least one stator part fixed to the other one of the first and second members, a movable element movable with respect to the stator part in a movable direction and connected to the one of the first and second members to be moved with respect to the other one of the first and second members, and an electromagnetic coil device for energizing the stator part to be magnetized so that a magnetic field for urging the movable element in the movable direction with respect to the stator part is generated;

wherein the stator part includes at least two pairs of magnetic poles, the at least two pairs are adjacent to each other in the movable direction, the magnetic poles of each of the at least two pairs face to each other through the movable element in a traverse direction perpendicular to the movable direction to generate the magnetic field passing the magnetic poles through the movable element, and a magnetic polar direction of one of the at least two pairs is opposite to that of the other one of the at least two pairs adjacent to the one of the at least two pairs in the movable direction when the stator part is magnetized; and wherein a first one of the magnetic poles of each of the at least two pairs faces to a first side surface of the movable element, a second one of the magnetic poles of each of the at least two pairs faces to a second side surface of the movable element opposite to the first side surface in the traverse direction, the stator part has a magnetic core and the electromagnetic coil device has an electromagnetic coil surrounding an intermediate portion of the magnetic core between longitudinal ends of the magnetic core to generate a magnetic field passing the longitudinal ends of the magnetic core so that the at least two pairs of magnetic poles are energized by the electromagnetic coil, and one of the longitudinal ends of the magnetic core forms both of the first one of the magnetic poles of the one of the at least two pairs and the second one of the magnetic poles of the other one of the at least two pairs while the other one of the longitudinal ends of the magnetic core forms both of the first one of the magnetic poles of the other one of the at least two pairs and the second one of the magnetic poles of the one of the at least two pairs.

21. A joint driving apparatus for generating a relative movement between first and second members on a joint, comprising a linear motor including:

at least one stator part fixed to the other one of the first and second members, a movable element movable with respect to the stator part in a movable direction and connected to the one of the first and second members to be moved with respect to the other one of the first and second members, and an electromagnetic coil device for energizing the stator part to be magnetized so that a magnetic field for urging the movable element in the movable direction with respect to the stator part is generated;

wherein the stator part includes at least two pairs of magnetic poles, the at least two pairs are adjacent to each other in the movable direction, the magnetic poles of each of the at least two pairs face to each other through the movable element in a traverse direction perpendicular to the movable direction to generate the magnetic field passing the magnetic poles through the movable element, and a magnetic polar direction of one of the at least two pairs is opposite to that of the other one of the at least two pairs adjacent to the one of the at least two pairs in the movable direction when the stator part is magnetized; and wherein the stator part is magnetized by a single electromagnetic coil.

22. A joint driving apparatus according to claim 21, further comprising at least two of the stator parts that are energized respectively to be magnetized with difference in energized phase between the at least two stator parts so that a traveling magnetic field for urging the movable element in the movable direction is generated by a cooperation between the at least two stator parts, and each of the stator parts is magnetized by single electromagnetic coil.

23. A joint driving apparatus according to claim 21, further comprising at least two of the stator parts that are energized respectively to be magnetized with a difference in energized phase between the at least two stator parts so that a traveling magnetic field for urging the movable element in the movable direction is generated by a cooperation between the at least two stator parts, the at least two pairs of magnetic poles in one of the stator parts is energized by single eletromagnetic coil and the at least two pairs of magnetic poles in another one of the stator parts is energized by another single electromagnetic coil.

* * * * *